United States Patent [19]
McLaren

[11] Patent Number: 5,331,602
[45] Date of Patent: Jul. 19, 1994

[54] ACOUSTIC NAVIGATION AND DIVING INFORMATION SYSTEM AND METHOD

[75] Inventor: Craig B. McLaren, Fullerton, Calif.

[73] Assignee: Hughes Aircraft Company, Los Angeles, Calif.

[21] Appl. No.: 53,032

[22] Filed: Apr. 26, 1993

[51] Int. Cl.⁵ .................... H04B 1/59; H04B 11/00; G01S 3/80

[52] U.S. Cl. ........................... 367/6; 367/127; 367/134

[58] Field of Search .................. 367/2, 6, 127, 134, 367/910

[56] References Cited

U.S. PATENT DOCUMENTS

| | | | |
|---|---|---|---|
| 4,097,837 | 6/1978 | Cyr | 367/6 |
| 4,401,987 | 8/1983 | Cyr | 367/2 |

Primary Examiner—Daniel T. Pihulic
Attorney, Agent, or Firm—W. K. Denson-Low

[57] ABSTRACT

The positions of one or more underwater divers or vehicles are determined through an underwater acoustic communication link and at least a base buoy and one remote buoy with acoustic transponders and GPS position locating equipment. The location of the buoys is determined by the GPS equipment. The underwater diver or vehicle each carries an acoustic tracking unit transponder which emits a tracking unit message specifying its identity and its last known position at an assigned time slot. Upon reception of the tracking unit message by the base buoy, an acoustic base buoy message is emitted which includes the buoy position. The tracking unit receives the base buoy message, and marks the time of arrival to determine the propagation delay between the tracking unit and the base buoy. A predetermined delay after the receipt of the tracking unit message by the remote buoy, it sends an acoustic remote buoy message specifying its location. The tracking unit receives the remote buoy message, marks its time of arrival, and determines its location from the times of arrival and the positions of the buoys. The base buoy can communicate with a base station, passing along all received tracking unit messages so that the base station can keep track of the locations of all tracking units. Commands from the base station can be encoded into the base buoy message, to provide instructions to the various divers and underwater vehicles.

33 Claims, 5 Drawing Sheets

ACOUSTIC NAVIGATION AND DIVING INFORMATION SYSTEM AND METHOD

BACKGROUND OF THE INVENTION

This invention relates to a navigation and communication system for underwater divers.

Underwater visibility is usually very poor, with range in coastal regions typically limited to between five and fifteen feet. In deep water, darkness and absence of color further reduce the visibility of landmarks. In order to navigate underwater, the diver conventionally has been required to figure his course in terms of distance and heading prior to entering the water. With some idea of how fast he is able to swim, the diver typically travels for a period of time corresponding to the desired distance, measured with a wristwatch, at the determined heading, measured with a hand-held compass. In many cases, the diver's underwater course is indirect, and includes several legs, i.e., distances travelled at different headings. These legs must all be determined prior to the dive.

Presently, the United States Navy uses the Swimmer Area Navigation System, which allows a diver to determine and record his current position in relation to diver-planted markers as position references. Each marker is equipped with an acoustic transducer, and a clock for keeping precise real time. Periodically at predetermined times, each marker transducer emits a ping, and the diver has a unit which determines his position relative to the markers, based on the predetermined time of sending the respective pings and the measured time of reception of the pings at the diver unit. Since these markers are not referenced to anything fixed in the environment, coordinates determined under one setup are unusable under another setup.

It is therefore an object of this invention to provide a diver navigation system enabling a diver to determine his position relative to fixed earth coordinates.

Another object of this invention to provide a diver navigation and communication system, which provides the capability of determining the position of a diver and reporting such position to a base station.

It is a further object of this invention to provide a system which provides two-way communication between a diver and a base station.

A further object is to provide a system which directs the diver to a desired destination.

SUMMARY OF THE INVENTION

An acoustic navigation system is described, for navigation of underwater divers and vehicles. The system includes a base unit transponder and a remote unit transponder separated by a distance sufficient to provide parallax. In one exemplary embodiment, the transponders are carried by buoys. The base unit includes a means for accurately determining its position relative to fixed earth coordinates, and a base transponder for transmitting and receiving digital acoustic messages via propagation through the water. The transmitted messages include data specifying the position of the base unit.

Similarly, the remote unit includes a means for accurately determining its position, and a transponder for receiving and transmitting digital acoustic messages via propagation through the water. The transmitted messages include position data specifying the position of the remote unit.

A tracking unit is provided for each diver or underwater vehicle whose position is to be tracked. The tracking unit includes a tracking unit transponder comprising means for transmitting tracking unit acoustic digital messages, means for receiving acoustic digital messages, and a processor. The processor determines the position of the tracking unit in dependence on data received from the base and remote units specifying the respective positions of the units, and propagation delays in the transmission of the acoustic messages underwater. The determination is made by use of time of arrival and triangulation techniques, using the known positions of the base and remote units and the depth of the tracking unit to calculate the tracking unit position.

The base unit message can include commands from a base control unit, which are decoded by the tracking unit and displayed on a tracking unit display. Such a command can include a heading command, and a display for presenting the commanded heading with the actual compass heading. The tracking unit message can include a message entered by the diver via a keypad, which is relayed by the base unit to the base control unit.

When a plurality of tracking units are involved, the tracking units are assigned a given time slot in which to transmit a tracking message. To avoid interference among the tracking units, the time slot is long enough to allow the message interchange with the base to complete.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
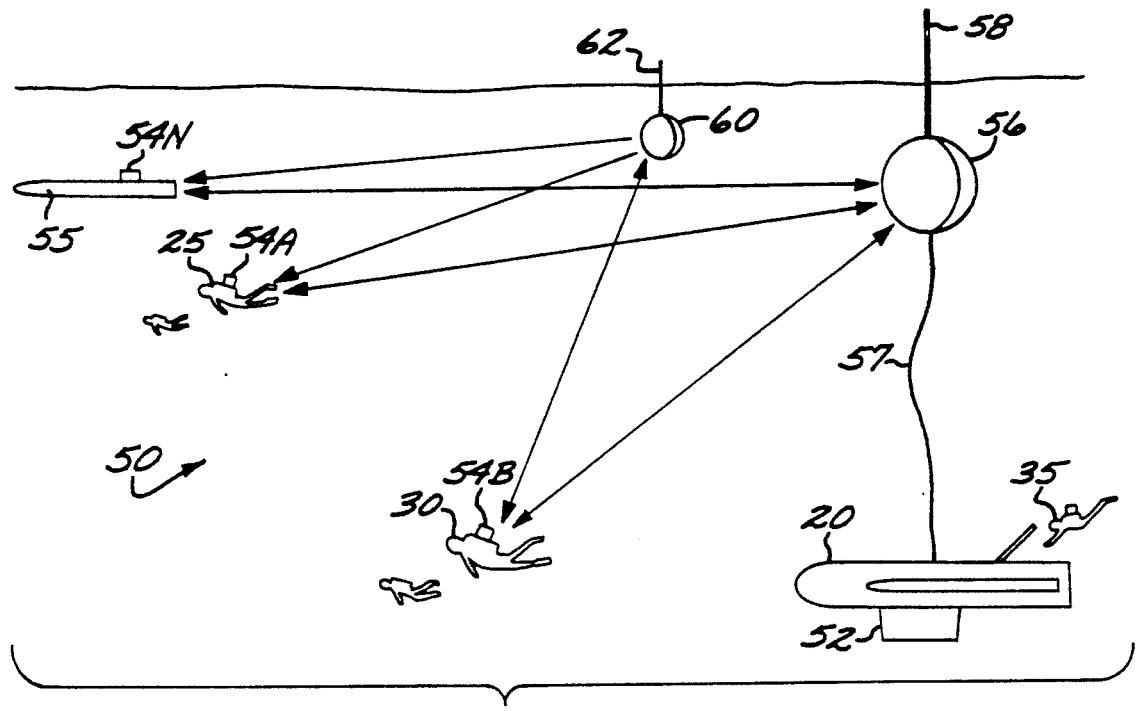
FIG. 1 is a schematic diagram illustrating an acoustic navigation and diving information system in accordance with the invention.

FIG. 1 illustrates elements of an acoustic navigation and diving information system 50 embodying the present invention. This system is adapted to service a base dive station 20 and one or more divers, such as divers 25 and 30, and remote underwater vehicles, e.g., vehicle 55. The system 50 enables the position of the remote underwater vehicles and the divers to be accurately determined, and provides a means of communication of position, navigation and other data between the divers and the base station 20. A base station operator 35 typically serves as the dive master for the divers 25 and 30 and the underwater vehicle 55.

The system 50 comprises one or more tracking units 54A-54N carried respectively by one or more divers 25 and 30 and in some applications by underwater vehicles, e.g., vehicle 55, a base buoy 56 comprising a global positioning system antenna 58, and one or more remote buoys 60 with a global positioning system antenna 62. The buoys float submerged near the water surface, with the antennas 58 and 62 extending above the water surface. The base station 20 includes a base station unit 52 which is connected to the base buoy 56 via a communication link 57, preferably an optical fiber link permitting secure communication between the buoy 56 and the base station unit 52. Other types of communication links could alternatively be employed, e.g., a cable permitting electrical signals to be communicated between the buoy 56 and the base station unit 52.

The base station unit 52 and the tracking units 54A-54N each comprise a real time clock, and each tracking unit is assigned a time slot in which it communicates messages. Each tracking unit includes an acoustic communication transponder for transmitting and receiving messages underwater.

The base buoy 56 and the remote buoy 60 are in communication with the global positioning system (GPS) which is now in service. The GPS includes a number of communication satellites in orbit about the earth, permitting a GPS ground station to determine its position with great precision. By RF communication from the satellites comprising the GPS via the GPS antennas 58 and 62, the location of each buoy 56 and 60 is known with precision. The buoys 56 and 60 are spaced apart to provide the necessary parallax.

Figure 3:
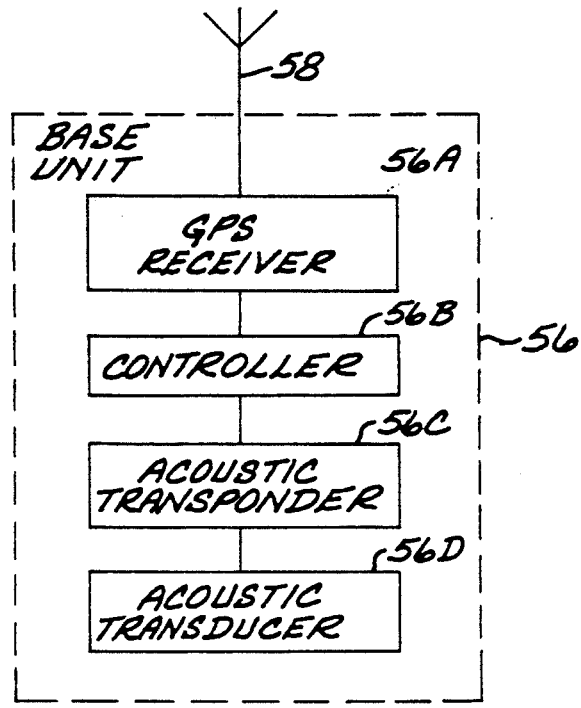
FIG. 3 is a schematic block diagram of a base unit as employed in the system of FIG. 1.

FIG. 3 is a schematic diagram showing the elements of the base buoy 56. In addition to the GPS antenna 58, the buoy includes a GPS receiver 56A for receiving signals from the GPS satellite system, a controller 56B for controlling the operation of the buoy, including decoding of received messages and formatting of transmit messages, an acoustic transponder 56C which permits acoustic messages to be transmitted and received underwater, and an acoustic transducer 56D which converts electrical signals from the transponder into acoustic signals, and vice versa. The buoy 56 may be wholly or partially submerged at the water surface, with the GPS antenna extending from the water surface.

Figure 4:
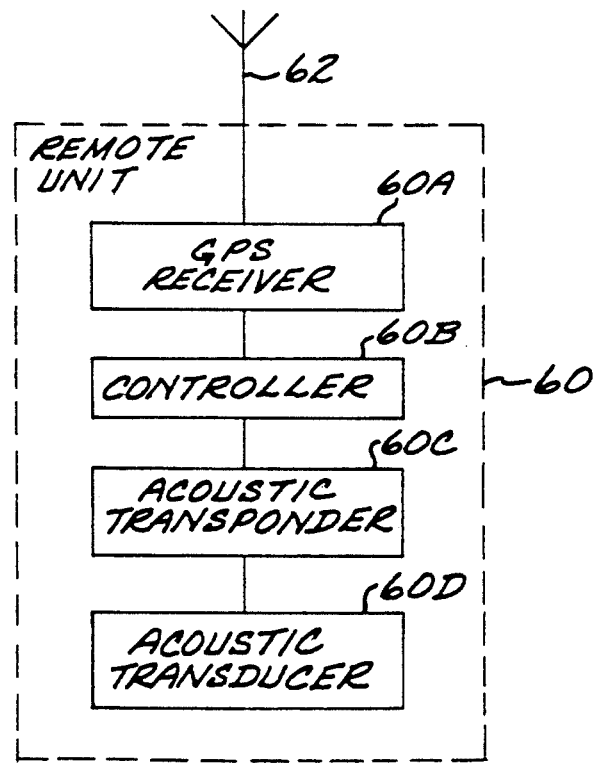
FIG. 4 is a schematic block diagram of a remote unit as employed in the system of FIG. 1.

As shown in FIG. 4, the remote buoy 60 includes a GPS receiver 60A coupled to the GPS antenna 62, a controller 60B for controlling the operation of the buoy, including message decoding and formatting, an acoustic transponder 60C for transmitting and receiving acoustic messages underwater, and an acoustic transducer 60D.

The invention is not limited to use with buoys to provide the reference signals, but instead the elements shown in FIGS. 3 and 4 could be secured to structures such as rocks, oil drilling platforms, boats and the like. Thus, while in the exemplary embodiment, the reference position signals are generated by separated acoustic transponders carried by buoys, it is to be understood that, in a general sense, the elements of FIGS. 3 and 4 may be considered to comprise a base transponder unit and a remote transponder unit. The base transponder unit comprises a base station, whose controller is carried by base dive station 20.

To determine a particular diver's location, the diver position is "triangulated" by the two GPS buoys 56 and 60. This information, together with the absolute buoy position known via the GPS system, fixes the diver's position within two axis, i.e., within a plane. The third dimension is determined by the diver's depth sensor; information regarding the diver's depth is transmitted as part of the message communicated by the diver tracking unit.

Figure 2:
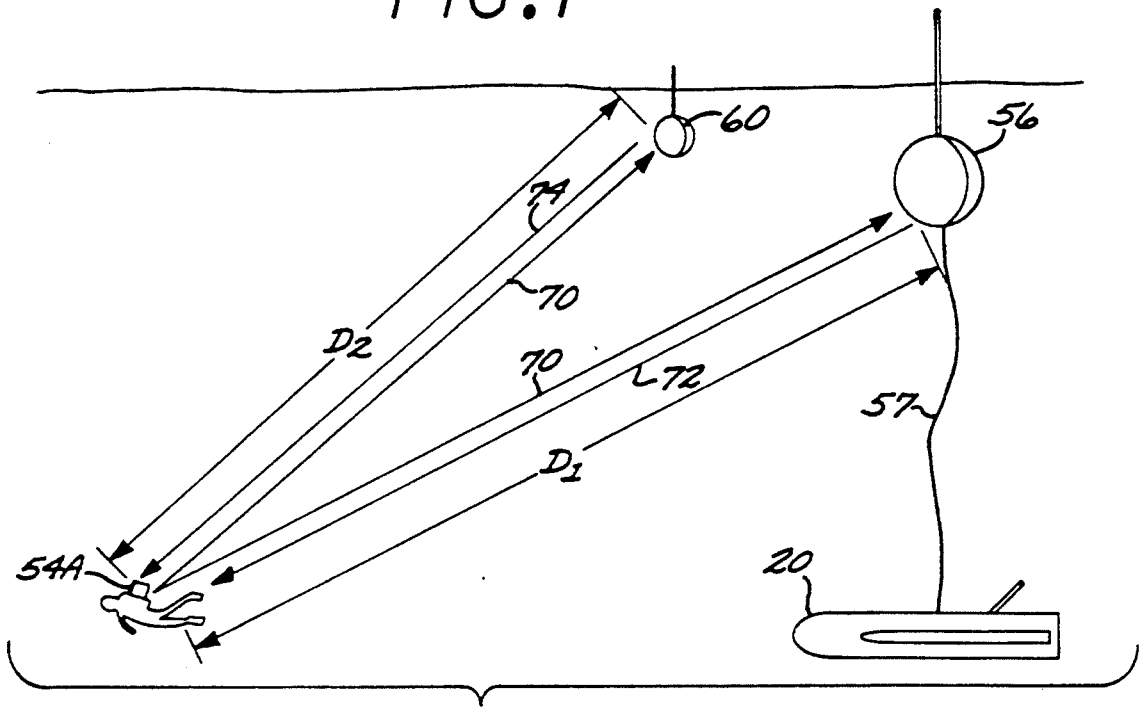
FIG. 2 illustrates the manner in which a particular underwater diver determines his position and communicates with a base unit.

In this embodiment, the triangulation is achieved by "time of arrival" calculations. The tracking unit determines its absolute position by determining its distance from each reference buoy 56 and 60, each of which has its position derived from the GPS. As illustrated in FIG. 2, an exemplary tracking unit 54A begins the process by issuing a tracking unit message 70 commencing at the beginning of its assigned time slot. After a predetermined, fixed time delay $\Delta T_1$ after receipt of the message, the base buoy 56 returns a command message 72 containing the GPS position of the buoy. The tracking unit 54A determines its distance from the base buoy 56 from the time delay $\Delta t_1$ between the time at which it transmitted the tracking unit message and the time at which it received the returned command message, $\Delta T_1$, and the known propagation velocity $V_s$ of acoustic energy through water under the existing water conditions. Thus, if the distance between the tracking unit 54A and the base buoy 56 is $D_1$, the distance can be computed using the following relationship.

$$D_1 = (\tfrac{1}{2})(\Delta t_1 - \Delta T_1)V_s$$

The tracking unit message is also received at the remote buoy 60. In order to determine the distance of the tracking unit 54A from the remote buoy 60, the remote buoy 60 issues a remote message 74 containing its GPS position a relatively long, predetermined, fixed time delay $\Delta T_2$ following receipt of the tracking unit message. The relatively long time delay $T_2$ prevents interference with the base buoy 56. The distance $D_2$ of the tracking unit from the remote buoy is determined from the time delay $\Delta t_2$ between transmission of the tracking unit message and receipt of the remote message at the tracking unit, minus the predetermined fixed time delay.

$$D_2 = (\tfrac{1}{2})(\Delta t_2 - \Delta T_2)V_s$$

The tracking unit message preferably includes the last known position of the tracking unit 54A and the tracking unit identification, and the base buoy 56 can relay the message 74 to the base station unit 52.

Figure 5:
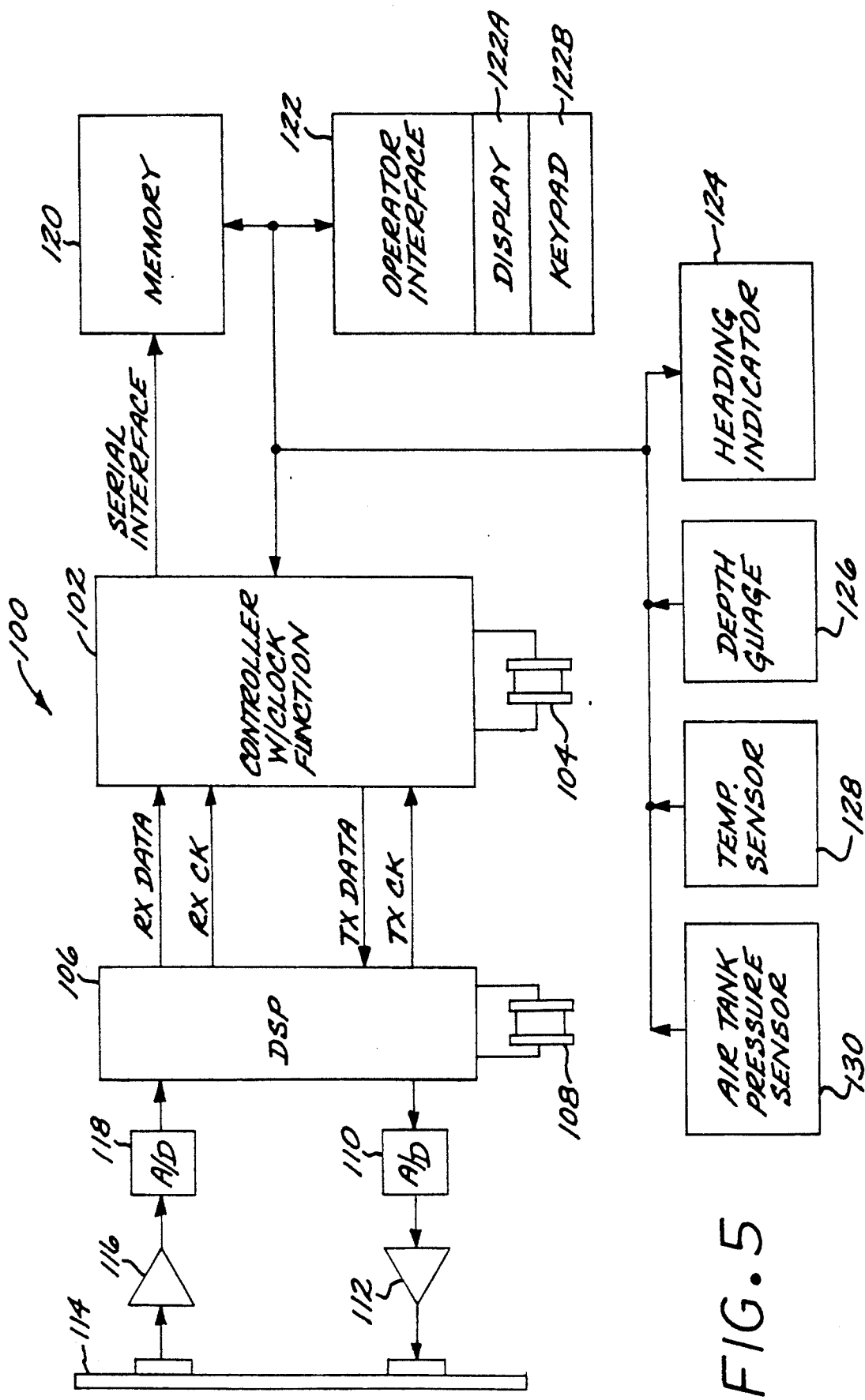
FIG. 5 is a schematic block diagram of a tracking unit carried by a diver or underwater vehicle in accordance with the invention.

FIG. 5 is a simplified block diagram of an exemplary tracking unit 100, carried by a diver or underwater vehicle whose position is to be located and tracked by the system. The messages are transmitted, in the preferred embodiment of the system 50, using a digital acoustic waveform and spread spectrum techniques. The tracking unit 100 includes a central processing unit (CPU) 102 which includes a clock function. The CPU is operated at a clock rate established by a clock signal generated by device 104. The CPU 102 communicates with a digital signal processor (DSP) chip 106, which may comprise a commercially available integrated circuit device such as the model TMS320C40 device marketed by Texas Instruments. The DSP 106 is operated at a clock rate established by a second clock signal generator 108, typically a much higher rate than the clock rate of device 104. For example, for an exemplary application, the CPU 102 may be clocked at a 32 KHz rate, and the DSP 106 at a 45 Mhz rate. The DSP clock rate must be high enough to allow the DSP to synthesize the transmit waveform and sample/process the received waveform. The frequency is at least 2.5 times the carrier frequency of the acoustic signal, in this exemplary embodiment. Thus, if the acoustic carrier frequency is 45 KHz, the DSP clock rate will typically be at least 2.5 times 45 KHz in order to run the DSP fast enough to keep up with the required processing. The actual required clock rate will depend on the particular software running for a given application. The controller clock rate need only be fast enough to allow the processor to keep up with the signal data rate. This is about 1/130th of the carrier frequency in this embodiment.

An output of the DSP 106 is converted from digital to analog form by digital-to-analog converter (DAC) 110, and after amplification by amplifier 112 drives an acoustic transducer 114. Acoustic signals received at the transducer 114 are amplified by amplifier 116, converted to analog form by analog-to-digital converter (ADC) 118, and the digital signals sent to an input port of the DSP 106 for processing. The CPU can control the unit 100 to operate in a message transmission mode, wherein the ADC is disabled from operation, and in a message reception mode, wherein the DAC is disabled from operation, in order to prevent interference between the transmitted and received signals. Alternatively, the transmit and receive functions could be performed simultaneously by the unit 100, provided the timing between the transmitted and received messages is controlled to keep $\Delta T_1$ and $\Delta T_2$ known.

The CPU 102 is connected to a memory 120, and via a peripheral bus to an operator interface unit 122 and various other peripheral devices, including a heading indicator 124, depth gauge 126, water temperature sensor 128 and air tank pressure sensor 130 to provide an indication of the air supply remaining to the diver. The operator interface unit 120 can be configured to be worn on the diver's wrist, for example, and includes a display 122A such as an LCD display and a keypad 122B. The diver can enter simple messages into the CPU 102 via the keypad 122B, and the display provides messages received from the base unit 54 to be communicated to the diver. The CPU 102 also receives information from the compass comprising heading indicator 124, and provides control signals to control the heading indicator function of device 124, as described in more detail regarding FIG. 7. The CPU collects depth information from sensor 126, water temperature data from sensor 128 and SCUBA tank pressure data from sensor 130. With the data from these various peripheral devices, the CPU 102 sends information data to be included in the transmitted message to the DSP 106.

Figure 6:
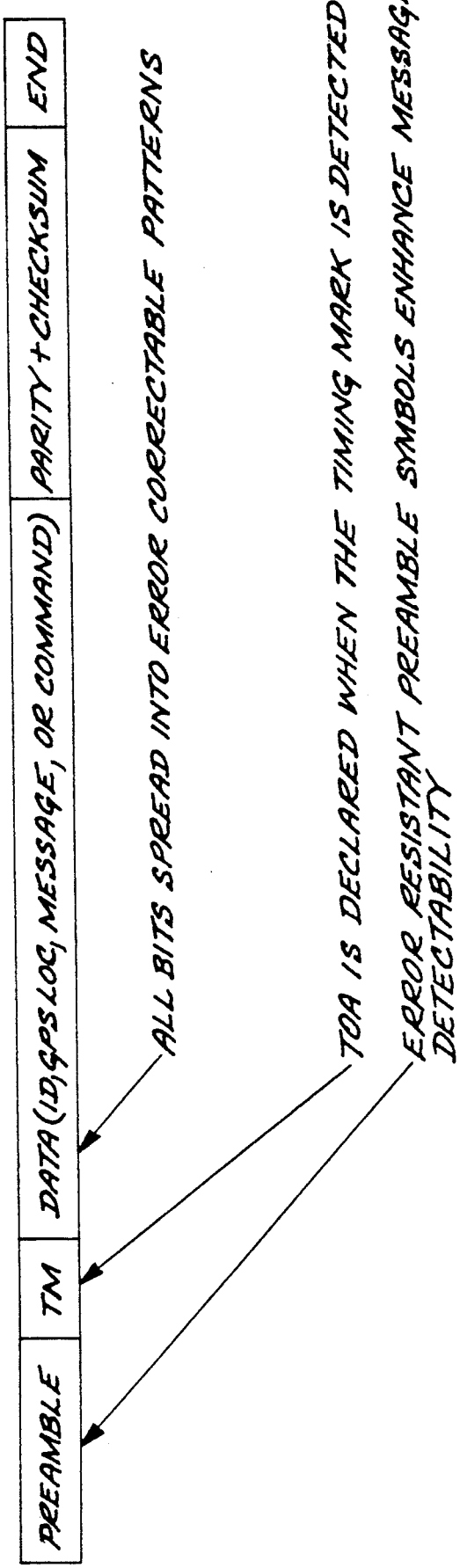
FIG. 6 is a diagram illustrating a typical tracking unit or base unit message format.

The DSP 106 comprises software which generates a preamble and timing mark at the start of the message, and an end mark at the end of the message, and provides the spread spectrum encoding to transform the data from the CPU into the waveform to be generated by the acoustic transducer 114, according to FIG. 6, in response to analog signals converted by DAC 110. The transducer 114 can be, e.g., a piezoelectric transducer.

In the receive mode of the unit 100, acoustic signals received by the transducer 114 are converted into digital form by ADC 118, and processed by DSP 106. In this mode, the DSP demodulates and decodes incoming messages, and accurately determines the time at which a timing mark comprising the incoming message is received. The decoded message is then sent to the CPU 102. From the received message and the accurately determined time of arrival of the timing mark, the CPU determines the time of propagation between the outgoing and incoming message timing marks, decodes the GPS positions of the buoys' set forth in the received messages, calculates the position of the tracking unit 54 from the time of propagation and GPS data, and decodes the command portion of the incoming message and sends this data to the display 108 and to the heading display 124.

FIG. 6 illustrates an exemplary tracking unit or base unit message format. In this form, the message includes a preamble portion, a timing mark portion, a data portion, a parity and checksum portion, and an end portion. The preamble comprises error resistant symbols to enhance message detectibility. For example, the preamble could include a predetermined number of 7 bit Barker symbol patterns, wherein each bit in the Barker pattern is a 13 bit Barker pattern, representing a "1", or a 13 bit inverse Barker pattern, representing a "0". A modulation technique such as continuous phase shift modulation (CPSM) can be used to modulate a "1" or a "0" in the 13 bit pattern. Similarly, the timing mark following the preamble preferably comprises an error resistant symbol, e.g., one 7 bit inverse Barker symbol pattern, i.e., a pattern different from the preamble patterns to be detected. A Time of Arrival (TOA) is declared when the timing mark is received by the tracking unit. The data portion of the message comprises a number of bits, preferably spread into error correctable patterns. Here again, Barker symbol patterns could be employed. The data encoded in the data portion can include, for example, the tracking unit address, GPS location, a message or a command. The parity and checksum portion ensures error correction capability, as is well known in the digital communication art. The end portion is a symbol signalling the end of the message, e.g., a 7 bit inverse Barker symbol. Other message formats may of course be employed. The remote buoy message follows the same format as shown in FIG. 6, but does not includes any data portion.

Figure 7:
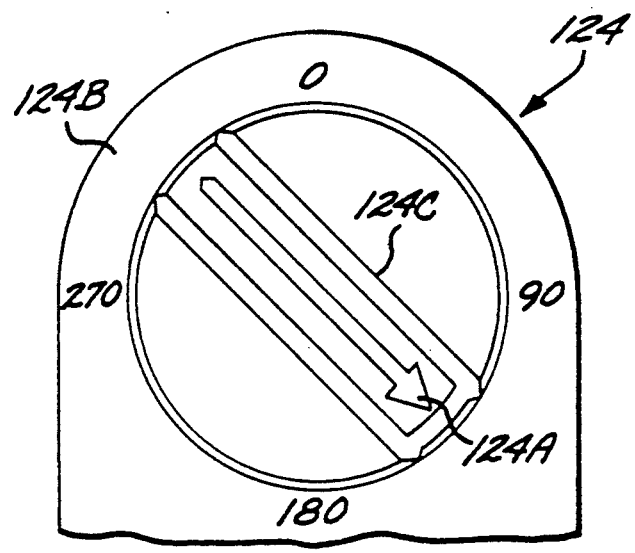
FIG. 7 illustrates the heading display comprising the tracking unit carried by a diver or vehicle in accordance with the invention.

The heading display 124 is shown in further detail in FIG. 7. The display 124 can be worn on the diver's arm, for example, and incorporates a compass comprises a compass needle 124A with a compass bezel 124B. The display 124 further includes an LCD heading display 124C which comprises a pair of spaced bars overlaying the compass needle. The display 124C is controlled by the CPU 104 in response to commands received from the base unit 52. The diver orients himself until the compass needle is aligned with the heading display 124C. The diver will then be traveling in the desired direction. Alternatively, if the tracking unit is carried by an underwater vehicle instead of a diver, the message data, including heading commands, are passed to the vehicle's computer.

Diver or vehicle information is returned to the base station unit via the tracking unit message, relayed by the base buoy 56. Commands to the diver or vehicle are embedded in the command messages. These commands may include GPS coordinates to which the diver is being directed, as well as the identification of the tracking unit to which the particular command or message is directed. Using the known position of the tracking unit, as determined in accordance with the invention as described above, the tracking unit calculates the necessary heading to the commanded coordinates, and then displays the heading information on the heading display 124C which overlays the compass 124B, and the diver orients himself until the compass needle aligns with the heading display. If the diver's course includes several legs of different headings, the base unit 52 sends the coordinates of the next leg end point as each leg is completed. Alternatively, the coordinated for all legs could be sent at once and stored in the tracking unit memory.

Figure 8:
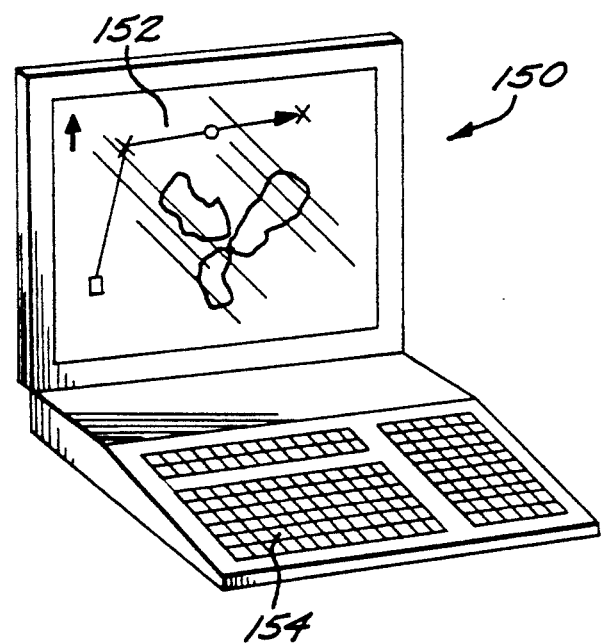
FIG. 8 illustrates the display function of the base unit employed in the system of FIG. 1.

The base station unit 52 employs the acoustic transponder of the base buoy in its communication with the divers and submerged vehicles, and includes a more powerful processor/controller and more capable display than are associated with the tracking units, e.g., capable of graphics display to display the positions of all the tracking units and the underwater terrain in which the tracking units are deployed. The exemplary base station unit 150, e.g., as shown in simplified form in FIG. 8, includes a larger display screen 152 and a more complete keyboard 154 than the keypad 106 comprising the tracking unit. Such a base unit 150 may, by way of example only, take the form of a laptop computer type of unit adapted in a preferred application for operation underwater. The keyboard 154 allows the dive master 35 located in the base station controlling the base unit 52 to keep track of the locations of the remotely deployed tracking units, and to send more complex or lengthy messages than is practical with the keypad comprising the tracking units. The base unit may be contained, for example, in a submerged vehicle, as shown in FIG. 1, or can be contained in a surface ship.

To illustrate the invention, assume that each tracking unit message includes a total of 346 bits, and that the system supports a data transmission rate of 346 bits per second, so that the message requires a transmission time of one second. The data may be modulated onto a 45 Khz carrier tone, using continuous phase shift modulation techniques.

In a typical system, there will be several divers or underwater vehicles whose positions are being monitored by the base unit 54. Each diver or vehicle carries a tracking unit, and is assigned a particular periodic time slot in which to send and receive messages and determine its position and communicate with the base unit. Thus, each tracking unit includes a real time clock function, to keep track of the time and enable the unit to communicate during its assigned time slot. In one exemplary embodiment, an exemplary time slot length is six seconds, but this is dependent on the application parameters, e.g., the range, number of divers, and the like.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. An acoustic navigation system for submerged navigation, comprising:

a base unit comprising means for accurately determining the position of said unit, a base transponder means for transmitting and receiving digital acoustic data messages via propagation through the water, wherein said transmitted messages comprise base unit position data specifying the position of said base unit;

a remote unit spatially separated from said base unit, said remote unit comprising means for accurately determining the position of said remote unit, a remote unit transponder means for receiving and transmitting digital acoustic data via propagation through the water, wherein said transmitted message comprises remote unit position data specifying the position of said remote unit; and a tracking unit whose underwater position is to be determined, comprising:

a tracking unit transponder comprising means for transmitting tracking unit acoustic digital messages and means for receiving acoustic digital messages; and processor means for determining said tracking unit position in dependence on data received from said base and remote units specifying the respective positions of said units and propagation delays in the transmission of said acoustic messages underwater.

2. The system of claim 1 wherein said base unit comprises means for initiating transmission of said base unit message in response to receipt of said tracking unit message, and said tracking unit comprises means for determining a first time delay between transmission of said tracking unit message and receipt of said base unit message transmitted in response thereto, and said means for determining said tracking unit position employs said time delay in said determination.

3. The system of claim 2 wherein said remote unit comprises means for initiating transmission of said remote unit message a predetermined fixed time delay after receipt of said tracking unit message, and said tracking unit comprises means for determining a second time delay between transmission of said tracking unit message and receipt of said remote unit message transmitted in response thereto, and said means for determining said tracking unit position employs said time delay in said determination.

4. The system of claim 1 wherein said tracking unit message includes data specifying the last known position of said tracking unit, and said base unit comprises means for transmitting said data to a base station upon receipt of said tracking unit message.

5. The system of claim 1 wherein said base unit message further includes command message data specifying commands to be transmitted to said tracking unit.

6. The system of claim 1 wherein said tracking unit further comprises operator interface means for conveying information to said operator.

7. The system of claim 6 wherein said operator interface means comprises a display means for displaying data.

8. The system of claim 1 wherein said tracking unit further comprises an operator interface means permitting an operator to input data to be included in said tracking unit message.

9. The system of claim 8 wherein said operator interface means comprises a keypad.

10. The system of claim 1 wherein said tracking unit message includes data specifying the tracking unit identity, its depth and its last known position.

11. The system of claim 10, wherein said base unit further comprises means for relaying received tracking unit messages to a base station.

12. The system of claim 1 wherein said base unit message includes command message data to be conveyed to said tracking unit.

13. The system of claim 12 wherein said command message data includes data specifying a particular heading for said tracking unit, and said tracking unit comprises means for displaying to an operator data indicating said heading.

14. The system of claim 13 wherein said displaying means comprises a heading indicator display operating in combination with a compass, said display indicating the actual compass heading and said particular heading specified by said command data.

15. The system of claim 14 wherein said heading indicator display comprises a first display means indicating said actual compass heading and a second display means indicating said particular heading specified by said command data, said second display means overlaying said first display means.

16. The system of claim 1 further comprising means for interfacing between said tracking unit processor and a sensor to permit sensor data to be input to said processor, and said message includes sensor data specifying a parameter measured by said sensor.

17. The system of claim 16 wherein said tracking unit is carried by a diver sustained by air from an air tank, and said sensor comprises a means for sensing the air pressure in said tank.

18. The system of claim 16 wherein said sensor comprises a depth gauge for measuring the depth of said tracking unit.

19. The system of claim 16 wherein said sensor comprises a sensor for measuring the water temperature.

20. The system of claim 1 wherein said base unit comprises a base buoy.

21. The system of claim 1 wherein said remote unit comprises a remote buoy.

22. A method for enabling an underwater object to determine its position, comprising:
deploying a base unit with means for accurately determining the position thereof;
deploying a remote unit with means for accurately determining the position thereof, at a location which is spaced from said base unit;
emitting a tracking unit digital acoustic message from said underwater object;
receiving said tracking unit message at said base unit;
emitting a base unit digital acoustic response message from said base unit in response to reception of said tracking unit message, said message including data specifying the location of said base unit;
receiving said base unit message at said object and marking the time of arrival to determine a first time delay between emitting said tracking unit message and receiving said base unit message;
receiving said tracking unit message at said remote unit;
emitting a remote unit digital acoustic response message from said remote unit a predetermined second time delay after reception of said tracking unit message, said remote unit message including data specifying the location of said remote unit;
receiving said remote unit message at said object and marking the time of arrival to determine a third time delay between emitting said tracking unit message and receiving said remote unit message; and
determining the position of said object from said first, second and third time delays and said data comprising said base unit and said remote unit messages specifying the locations of said base and remote units.

23. The method of claim 22 wherein said tracking unit message comprises data specifying a last known position of said object.

24. The method of claim 22 wherein said tracking unit message comprises data uniquely identifying said object.

25. The method of claim 22 wherein said message comprises data specifying the depth of said object.

26. The method of claim 22 wherein said tracking unit comprises a clock for keeping real time, and said tracking unit messages are emitted only during predetermined time intervals assigned to said tracking unit.

27. An acoustic navigation and communication system for underwater divers or vehicles, comprising:
a base unit comprising means for accurately the position of said unit, a base transponder means for transmitting and receiving digital acoustic data messages via propagation through the water, wherein said transmitted messages comprise base unit position data specifying the position of said base unit;
a remote unit spatially separated from said base buoy, said remote unit comprising means for accurately determining the position of said remote unit, a remote unit transponder means for receiving and transmitting digital acoustic data via propagation through the water, wherein said transmitted message comprises remote unit position data specifying the position of said remote unit;
a plurality of tracking units whose underwater position is to be determined, each tracking unit comprising:
a tracking unit transponder comprising means for transmitting tracking unit acoustic digital messages during preassigned time intervals unique to that tracking unit and means for receiving acoustic digital messages, said tracking unit digital messages identifying the particular tracking unit and comprising data indicating a last known position for said tracking unit;
processor means for determining said tracking unit position in dependence on data received from said base and remote units specifying the respective positions of said units and propagation delays in the transmission of said acoustic messages underwater;
a base station, comprising means for communicating commands to said tracking units and receiving tracking unit messages via said base unit, and means for processing said tracking unit messages to ascertain the location of each tracking unit.

28. The system of claim 27 wherein said commands from said base unit comprise heading commands to one or more of said tracking units, indicating the particular heading to which the operator of the particular tracking unit is commanded to assume.

29. The system of claim 27 wherein said tracking units further comprise operator means for entering data to comprise said tracking unit messages.

30. The system of claim 29 wherein said operator means comprises a keypad.

31. The system of claim 27 wherein said base station is submerged, and connected to said base unit by a communication link.

32. The system of claim 27 wherein said base unit comprises a base buoy.

33. The system of claim 27 wherein said base unit comprises a remote buoy.

* * * * *